US012137285B2

(12) United States Patent
Patel

(10) Patent No.: US 12,137,285 B2
(45) Date of Patent: Nov. 5, 2024

(54) CAMERA PEEK INTO TURN

(71) Applicant: Waymo LLC, Mountain View, CA (US)

(72) Inventor: Nirmal Patel, Sunnyvale, CA (US)

(73) Assignee: WAYMO LLC, Mountain View, CA (US)

(*) Notice: Subject to any disclaimer, the term of this patent is extended or adjusted under 35 U.S.C. 154(b) by 356 days.

(21) Appl. No.: 17/207,787

(22) Filed: Mar. 22, 2021

(65) Prior Publication Data

US 2021/0211576 A1 Jul. 8, 2021

Related U.S. Application Data

(63) Continuation of application No. 15/364,914, filed on Nov. 30, 2016.

(51) Int. Cl.
*H04N 23/60* (2023.01)
*B60R 1/27* (2022.01)
(Continued)

(52) U.S. Cl.
CPC ............ *H04N 23/64* (2023.01); *B60R 1/27* (2022.01); *B60R 1/28* (2022.01); *G05D 1/0094* (2013.01); *G05D 1/0246* (2013.01); *G06T 15/20* (2013.01); *H04N 23/63* (2023.01); *H04N 23/69* (2023.01); *B60R 2300/302* (2013.01);
(Continued)

(58) Field of Classification Search
None
See application file for complete search history.

(56) References Cited

U.S. PATENT DOCUMENTS 5,555,354 A 9/1996 Strasnick et al.
5,945,927 A 8/1999 Nakayama et al.
(Continued)

FOREIGN PATENT DOCUMENTS

CN 103770706 A 5/2014
CN 103786644 A 5/2014
(Continued)

OTHER PUBLICATIONS

Kojima, et al., "NaviView: Visual Assistance by Virtual Mirrors at Blind Intersection," Oct. 2005.*
(Continued)

*Primary Examiner* — Michael J Hess
(74) *Attorney, Agent, or Firm* — BOTOS CHURCHILL IP LAW

(57) ABSTRACT

Aspects of the disclosure relate to adjusting a virtual camera's orientation when a vehicle is making a turn. One or more computing devices may receive the vehicle's original heading prior to making the turn and the vehicle's current heading. Based on the vehicle's original heading and the vehicle's current heading, the one or more computing devices may determine an angle of a turn the vehicle is performing and The one or more computing devices may determine a camera rotation angle and adjust the virtual camera's orientation relative to the vehicle to an updated orientation by rotating the virtual camera by the camera rotation angle and generate a video corresponding to the virtual camera's updated orientation. The video may be displayed on the display by the one or more computing devices.

17 Claims, 19 Drawing Sheets

(51) Int. Cl.
  *B60R 1/28* (2022.01)
  *G05D 1/00* (2024.01)
  *G06T 15/20* (2011.01)
  *H04N 23/63* (2023.01)
  *H04N 23/69* (2023.01)

(52) U.S. Cl.
  CPC ... *B60R 2300/602* (2013.01); *B60R 2300/605* (2013.01); *B60R 2300/8086* (2013.01)

(56) References Cited

U.S. PATENT DOCUMENTS

| | | | |
|---|---|---|---|
| 6,611,202 | B2 | 8/2003 | Schofield et al. |
| 2011/0246409 | A1 | 10/2011 | Mitra |
| 2012/0062739 | A1* | 3/2012 | Large .................. G06T 7/33 348/143 |
| 2012/0087546 | A1* | 4/2012 | Focke .................. B60R 1/27 382/104 |
| 2013/0321400 | A1 | 12/2013 | Van Os et al. |
| 2013/0321472 | A1* | 12/2013 | Piemonte ............. G06F 1/1626 345/672 |
| 2013/0345980 | A1 | 12/2013 | Van Os et al. |
| 2014/0169630 | A1 | 6/2014 | Fukata et al. |
| 2014/0192181 | A1* | 7/2014 | Taylor .................. B60Q 9/00 348/118 |
| 2014/0292805 | A1* | 10/2014 | Yamada ................ G09G 5/00 345/629 |
| 2014/0347450 | A1* | 11/2014 | Han .................... B60R 1/27 348/47 |
| 2014/0365126 | A1* | 12/2014 | Vulcano .............. G01C 21/362 701/533 |
| 2015/0345976 | A1* | 12/2015 | Moore ............... G01C 21/3632 701/519 |
| 2016/0203719 | A1 | 7/2016 | Divekar et al. |
| 2017/0182406 | A1* | 6/2017 | Castiglia ............. A63F 13/213 |
| 2017/0274822 | A1 | 9/2017 | Haggerty et al. |
| 2018/0286095 | A1* | 10/2018 | Kusayanagi .......... G06T 11/60 |
| 2019/0164430 | A1* | 5/2019 | Nix .................... B60R 11/04 |

FOREIGN PATENT DOCUMENTS

| | | |
|---|---|---|
| DE | 10063980 A1 | 11/2002 |
| DE | 102009006475 A1 | 7/2010 |
| EP | 2869267 A1 | 5/2015 |
| JP | H07218280 A | 8/1995 |
| JP | H1089978 A | 4/1998 |
| JP | H1089988 A | 4/1998 |
| JP | H1089990 A | 4/1998 |
| JP | 2000251197 A | 9/2000 |
| JP | 2003337032 A | 11/2003 |
| JP | 2008148114 A | 6/2008 |
| JP | 2008149879 A | 7/2008 |
| JP | 2010247829 A | 11/2010 |
| JP | 2011035816 A | 2/2011 |
| JP | 2011259152 A | 12/2011 |
| JP | 2012071832 A | 4/2012 |
| JP | 2012195793 A | 10/2012 |
| JP | 2015015527 A | 1/2015 |
| JP | 2015507386 A | 3/2015 |
| JP | 2015108519 A | 6/2015 |
| KR | 101265711 B1 | 5/2013 |
| WO | 2015179760 A1 | 11/2015 |

OTHER PUBLICATIONS

New Jersey Driver Manual 2022. Obtainable at https://www.state.nj.us/mvc/pdf/license/drivermanual.pdf.*
Commerical Driver Manual, 2015. Obtainable at https://www.state.nj.us/mvc/pdf/license/CDL_Manual.pdf.*
Singapore Search Report and Written Opinion for Application No. 11201904469S dated Apr. 7, 2020.
International Search Report and Written Opinion for Application No. PCT/US2017/062295, dated Feb. 23, 2018, 11 pages.
Jain , et al., "Car that Knows Before You Do: Anticipating Maneuvers via Learning Temporal Driving Models", IEEE, Apr. 10, 2015, pp. 3182-3190.
Notice of Reasons for Rejection for Japanese Patent Application No. 2021-063921, May 25, 2022.
Notice of Allowance for Chinese Patent Application No. 201780074305.9, Jun. 8, 2023.

* cited by examiner

CAMERA PEEK INTO TURN

CROSS REFERENCE TO RELATED APPLICATIONS

The present application is a continuation of U.S. patent application Ser. No. 15/364,914, filed Nov. 30, 2016, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers or a remote operator may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to provide, to occupants of the vehicle, a visual indication of objects detected in the vicinity of a vehicle as well as what those objects are likely to do for some brief period into the future.

To provide occupants of the vehicle with information about the vehicle's environment, a display in the vehicle may present a video generated by a virtual camera system from the perspective of a virtual camera fixed relative to the vehicle at a default position. The video may include imagery within a set field of view corresponding to the position of the virtual camera including a portion of the vehicle's surroundings and the vehicle's projected trajectory. Upon the vehicle performing a turn, the virtual camera will remain in the default position, such that the video will continue to provide imagery located within the set field of view.

At the same time, such information can be used to control the vehicle in order to avoid these objects, or minimize damage in the case of an unavoidable collision. Thus, detection, identification, and prediction are critical functions for the safe operation of autonomous vehicle.

BRIEF SUMMARY

This technology generally relates to adjusting a virtual camera's orientation when a vehicle is making a turn. One or more computing devices may receive the vehicle's original heading prior to making the turn and the vehicle's current heading. Based on the vehicle's original heading and the vehicle's current heading, the one or more computing devices may determine an angle of a turn the vehicle is performing. The one or more computing devices may determine a camera rotation angle and adjust the virtual camera's orientation relative to the vehicle to an updated orientation by rotating the virtual camera by the camera rotation angle. A video corresponding to the virtual camera's updated orientation may be generated by the one or more computing devices and displayed on a display.

The vehicle's original heading and the vehicle's current heading may be received from the vehicle's positioning system.

Determining the angle of the turn may be determined by calculating the difference between the vehicle's original heading from the vehicle's current heading.

The camera rotation angle may be based on the angle of the turn, and is calculated by inputting the angle of the turn into a squashing function and receiving an outputted angle, wherein the outputted angle is the camera rotation angle.

The virtual camera's orientation may be adjusted and the video may be displayed while the vehicle is making the turn.

The vehicle's current heading may be a projected heading and the virtual camera's orientation may be updated before the vehicle performs the turn.

The camera rotation angle may be calculated by inputting the angle of the turn into a squashing function and receiving an outputted angle and the outputted angle may be the camera rotation angle.

The camera rotation angle may be determined by accessing a table including predetermined camera rotation angles for each angle of the turn.

A system for adjusting a virtual camera's orientation when a vehicle is making a turn may comprise one or more processors configured to receive the vehicle's original heading prior to making the turn and the vehicle's current heading and determine, based on the vehicle's original heading and the vehicle's current heading, an angle of a turn the vehicle is performing. The one or more processors may be further configured to determine a camera rotation angle, adjust the virtual camera's orientation relative to the vehicle to an updated orientation by rotating the virtual camera by the camera rotation angle, generate a video corresponding to the virtual camera's updated orientation, and display the video.

A non-transitory computer readable medium on which instructions are stored, the instructions when executed by one or more processors, may cause the one or more processors to perform a method of adjusting a virtual camera's orientation when a vehicle is making a turn. The method may comprise receiving the vehicle's original heading prior to making the turn and the vehicle's current heading, determining, based on the vehicle's original heading and the vehicle's current heading, an angle of a turn the vehicle is performing, determining a camera rotation angle, adjusting the virtual camera's orientation relative to the vehicle to an updated orientation by rotating the virtual camera by the camera rotation angle, generating a video corresponding to the virtual camera's updated orientation, and displaying, on a display, the video.

DETAILED DESCRIPTION

Overview

Figure 1:
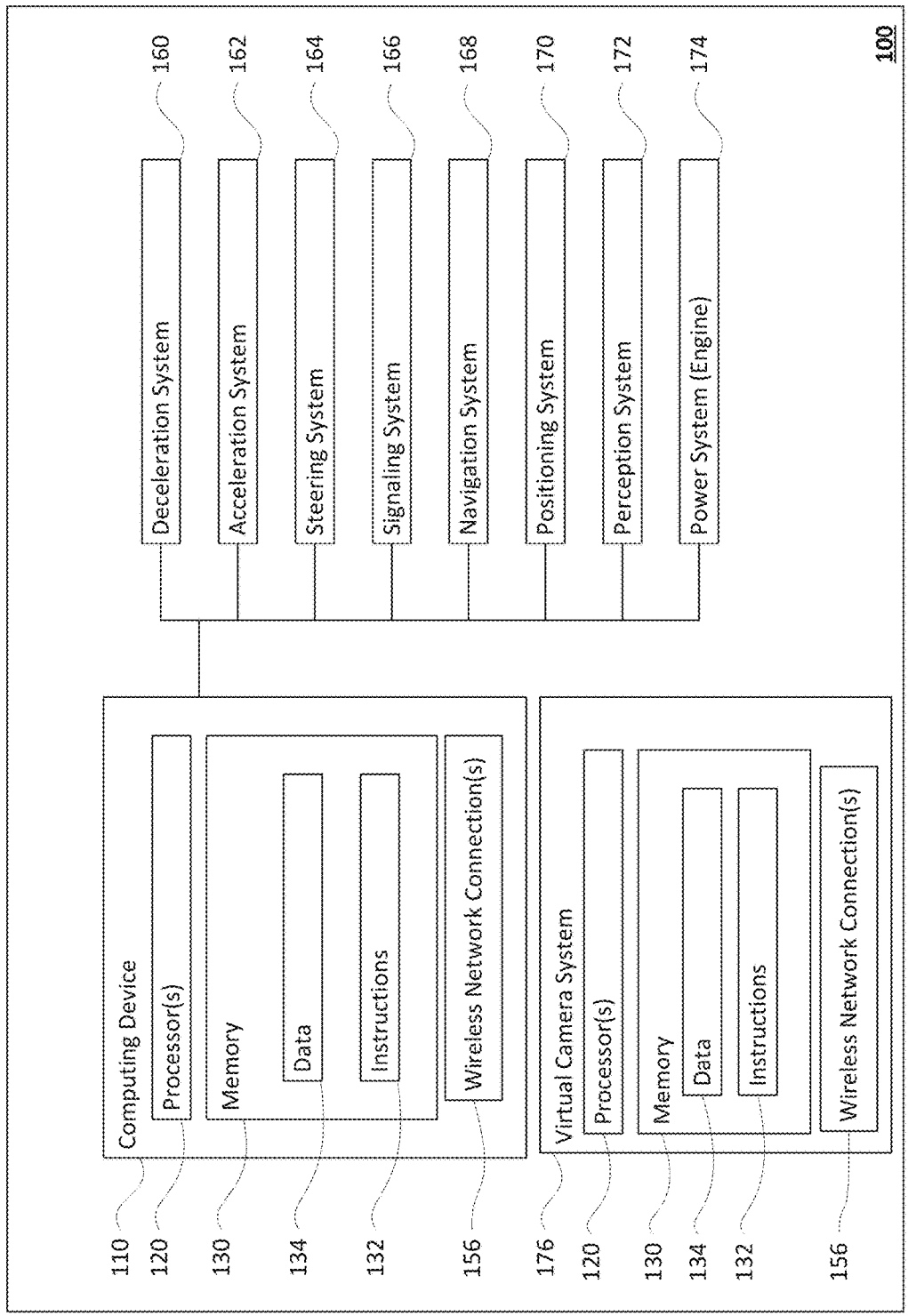
FIG. 1 is a functional diagram of an example vehicle in accordance with aspects of the disclosure.
Figure 2A:
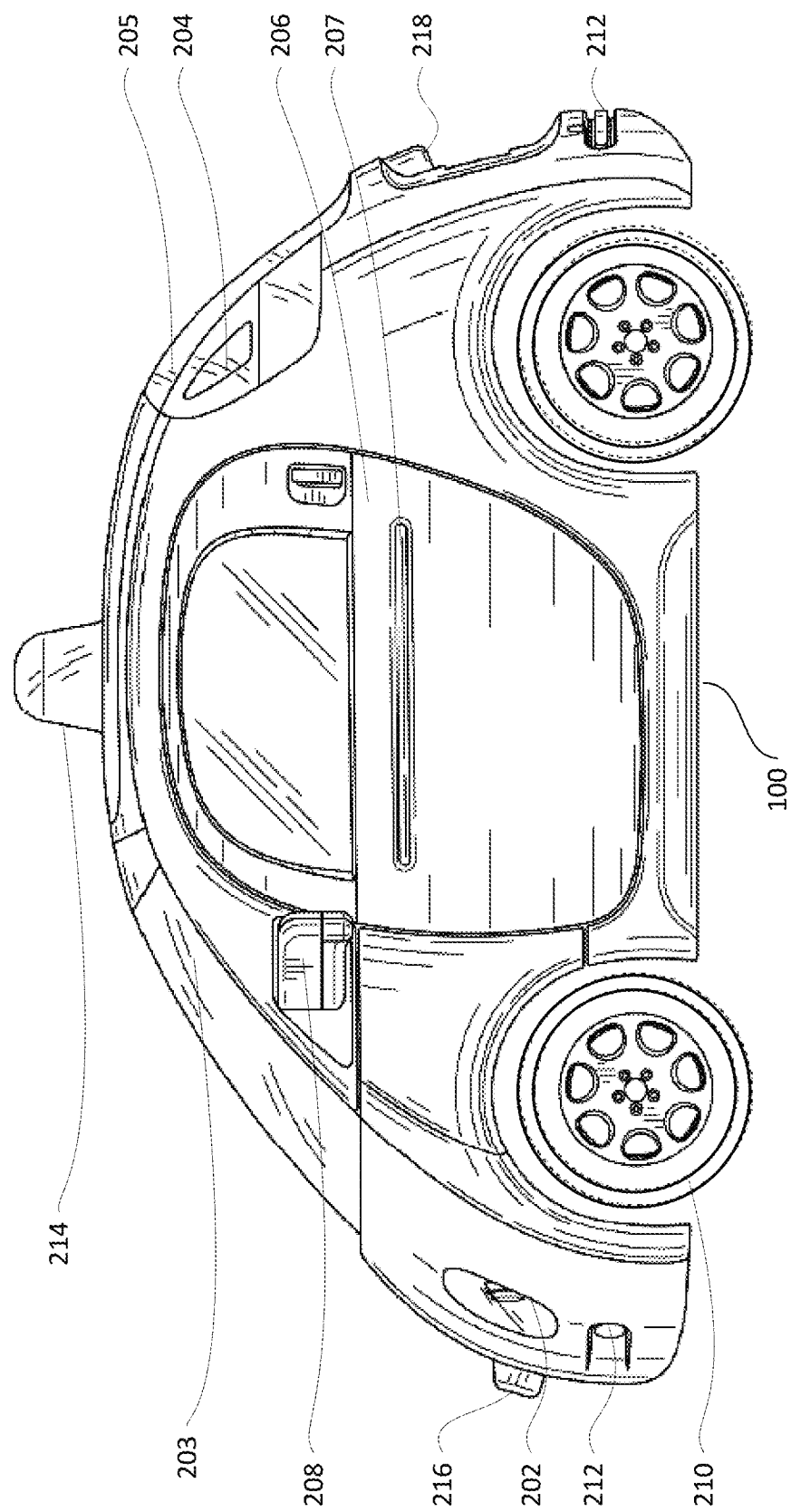
FIGS. 2A-2D are example external views of a vehicle in accordance with aspects of the disclosure.
Figure 2C:
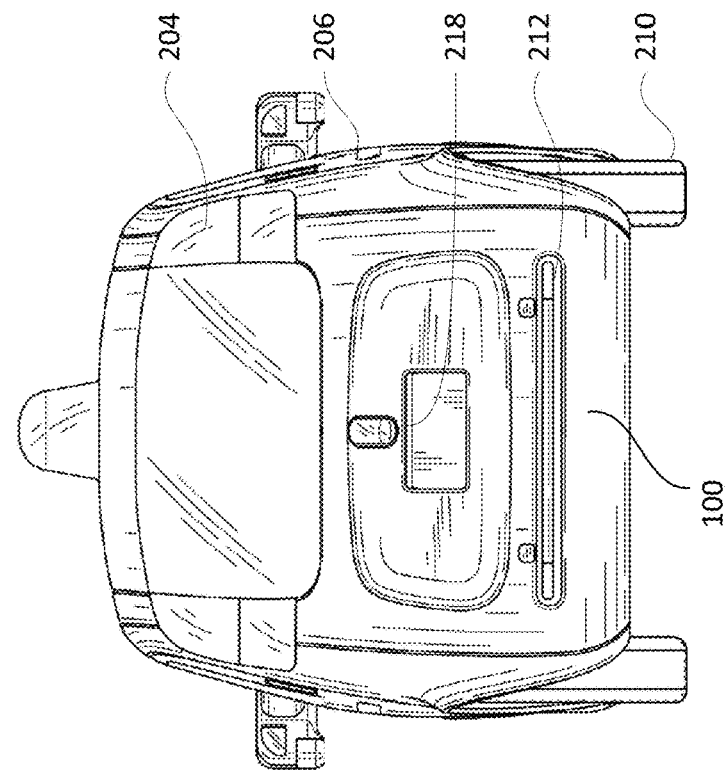
Figure 2B:
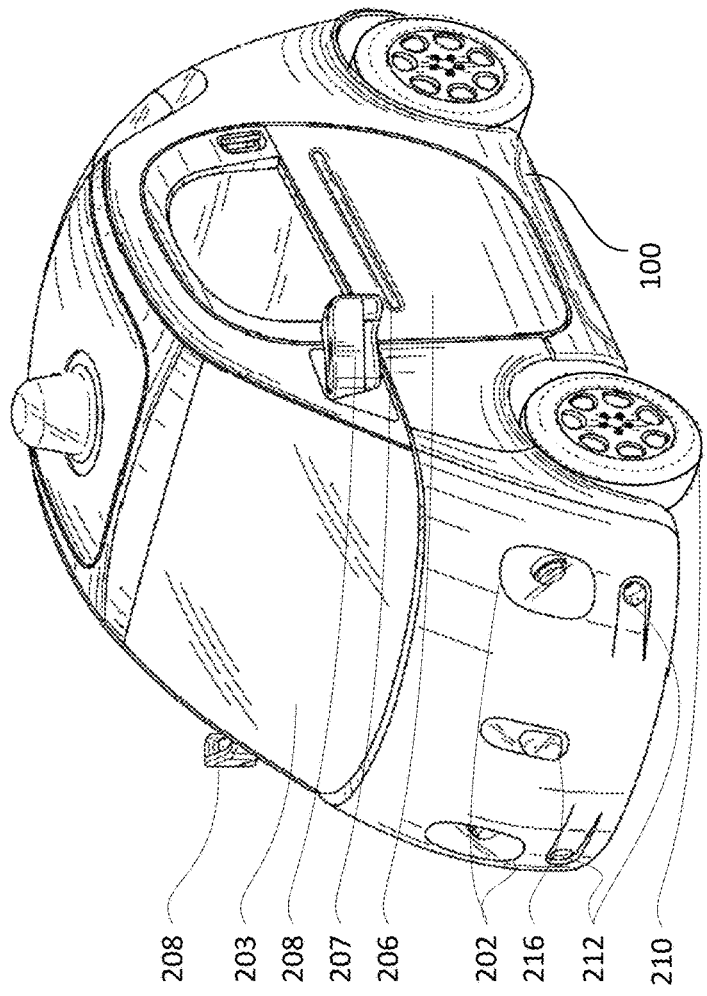
Figure 2D:
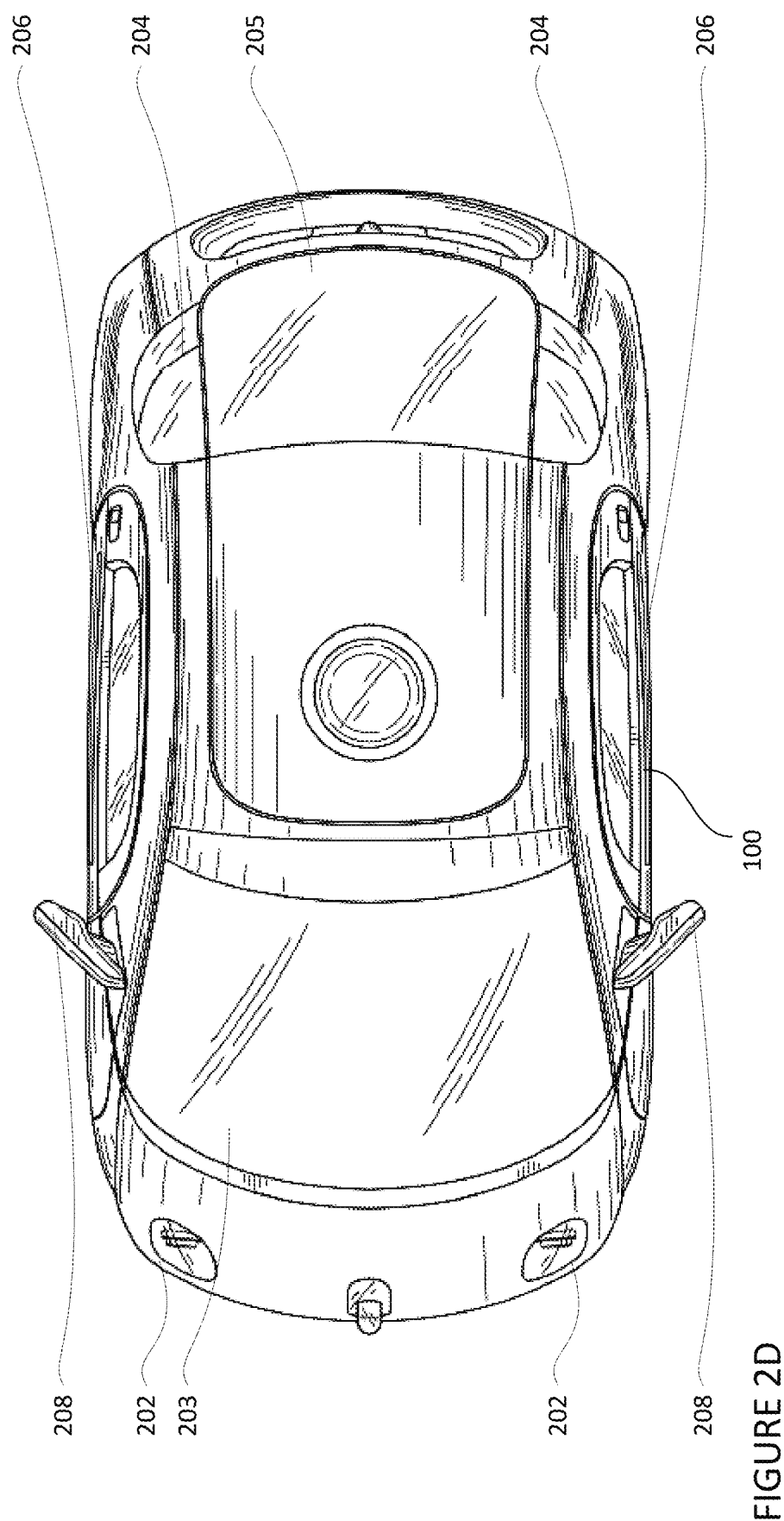

The technology generally relates to providing passengers with information about a vehicle's environment. This may include, for instance, adjusting a virtual camera's position and orientation when the vehicle is making a turn. For instance, as the vehicle performs a turn the position of the virtual camera may be rotated around the vehicle to present video within an adjusted field of view corresponding to the vehicle's anticipated heading. In this regard, a computing device within the vehicle may transmit information to a virtual camera system corresponding to the vehicle's surroundings and positioning. Based on the received information, the virtual camera system may generate the video from a perspective of the virtual camera using the received data. The video may be generated by overlaying the vehicle's projected trajectory and detected objects on a map corresponding to the route the vehicle is traveling.

The distance the virtual camera rotates around the vehicle may be based on the angle of the turn the vehicle is performing. The virtual camera system may input the angle of the turn the vehicle is performing, relative to the heading the vehicle was traveling prior to the turn, into a rotation table and output a corresponding camera rotation angle by which the virtual camera may be rotated. The virtual camera system may continually update the camera rotation angle as the vehicle progresses through the turn.

The virtual camera system may determine an anticipated angle of an upcoming turn of the vehicle based on the vehicle's projected trajectory and begin to rotate the virtual camera at a predetermined distance before the vehicle makes the turn. For example, the virtual camera system may determine a distance the vehicle is from the upcoming turn and the anticipated angles of the turn the vehicle will be making. Upon determining the projected turn is located at or less than the predetermined distance, the virtual camera system may begin to rotate the virtual camera through camera rotation angles corresponding to the anticipated angles of the turn.

The virtual camera may remain stationary when the vehicle is stopped or projected to stop. For instance, the virtual camera may determine the vehicle's projected trajectory anticipates the vehicle will pass through a stop light. As such, the virtual camera may not rotate until the car travels through the stop light.

To minimize minor camera rotations, such as those caused by minor oversteering corrections, and to smooth larger camera rotations, the virtual camera system may use a squashing function. For instance, the angle of the turn the vehicle is performing may be input into the squashing function and a camera angle rotation value, which is the same, or more gradual than the angles of the turn, may be output.

At unprotected turns, the virtual camera system may rotate the virtual camera to generate imagery corresponding to oncoming traffic at unprotected turns. For instance, the virtual camera may rotate in the opposite direction of the vehicle's projected trajectory to generate imagery corresponding to other vehicles travelling on the road where the vehicle is attempting to turn.

The height and pitch of the virtual camera may also be adjusted to capture more or less of the vehicle's surroundings. For example, when the vehicle is stopped at an intersection the virtual camera may be positioned above the vehicle and the pitch of the virtual camera may be adjusted such that it looks straight down to the vehicle. The virtual camera may then generate a video which includes imagery of the vehicle's surroundings on all sides of the vehicle.

The features described above may allow a vehicle, such as an autonomous vehicle, to provide video of the vehicle's trajectory and surroundings to its passenger. By rotating the virtual camera generating the video, passengers are provided with information regarding the vehicle's projected trajectory or surroundings located further along the projected trajectory and consistent with the surroundings they would expect to see if they were manually driving the vehicle. Further, the video of the vehicle's trajectory and surroundings may be provided to individuals or systems located outside of the vehicle to the provide them with the video to remotely monitor and/or control the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein.

The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may be capable of communicating with various components of the vehicle. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and virtual camera system 176 in order to control the movement, acceleration, speed, operation, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed and acceleration of the vehicle. For example, the acceleration system 162 may provide signals to the engine 174 to accelerate at a particular rate. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

The virtual camera system 176 may aggregate data from the systems of the vehicle to generate a video of the vehicle's surroundings for display in the vehicle. The video may include imagery within a set field of view corresponding to the position of the virtual camera including a portion of the vehicle's surroundings and the vehicle's projected trajectory. For instance, the virtual camera system may aggregate data from the vehicle's perception system, 172, such as objects external to the vehicle with a particular range, data from the positioning system 170, such as the vehicle's current location, and data from the navigation system 168, such as the vehicle's projected trajectory. The virtual camera system may take such information and generate a video by overlaying the vehicle's projected trajectory and detected objects on a map corresponding to the route the vehicle is traveling. The video generated by the virtual camera system 176 may be presented to the vehicle's passengers, other individuals, or recorded for future viewing, such as on a display in the vehicle. The virtual camera system may include some or all of the components of the computing device 110 as described herein, such as processor 120, memory 130, data 134, instructions 132, and wireless network connections 156. Likewise, in addition to, or alternatively to the functions of the virtual camera system described herein, the virtual camera system may perform the functions of a computing device 110. In this regard, the virtual camera system may communicate with each system of the vehicle such as systems 160-174.

FIGS. 2A-2D are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 204, and turn signal/parking lights 212 may be associated the signaling system 166. Light bar 207 may also be associated with the signaling system 166.

Vehicle 100 also includes sensors of the perception system 172. For example, housing 214 may include one or more laser devices for having 360 degree or narrower fields of view and one or more camera devices. Housings 216 and 218 may include, for example, one or more radar and/or sonar devices. The devices of the perception system 172 may also be incorporated into the typical vehicle components, such as taillights/turn signal lights 204 and/or side view mirrors 208. Each of these radar, camera, and lasers devices may be associated with processing components which process data from these devices as part of the perception system 172 and provide sensor data to the computing devices 110.

The computing devices 110 may control the direction and speed of the vehicle by controlling various components. By way of example, computing devices 110 may navigate the vehicle to a destination location completely autonomously using data from the detailed map information and navigation system 168. In order to maneuver the vehicle, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between a power system 174 (for instance, a gas or electric engine) of the vehicle and the wheels of the vehicle. Again, by controlling these systems, computing devices 110 may also control the drivetrain of the vehicle in order to maneuver the vehicle autonomously.

Figure 3:
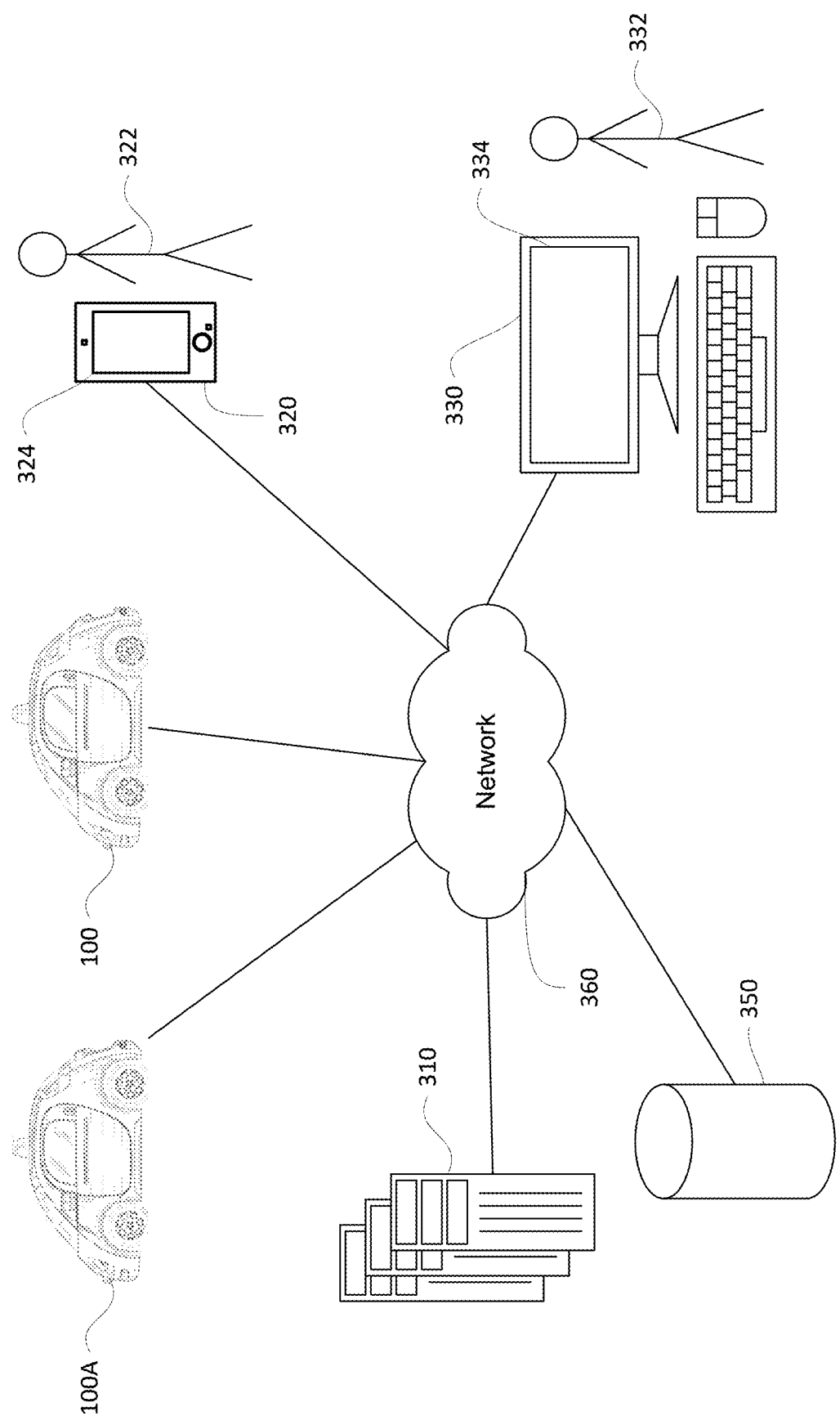
FIG. 3 is a pictorial diagram of a system in accordance with aspects of the disclosure.
Figure 4:
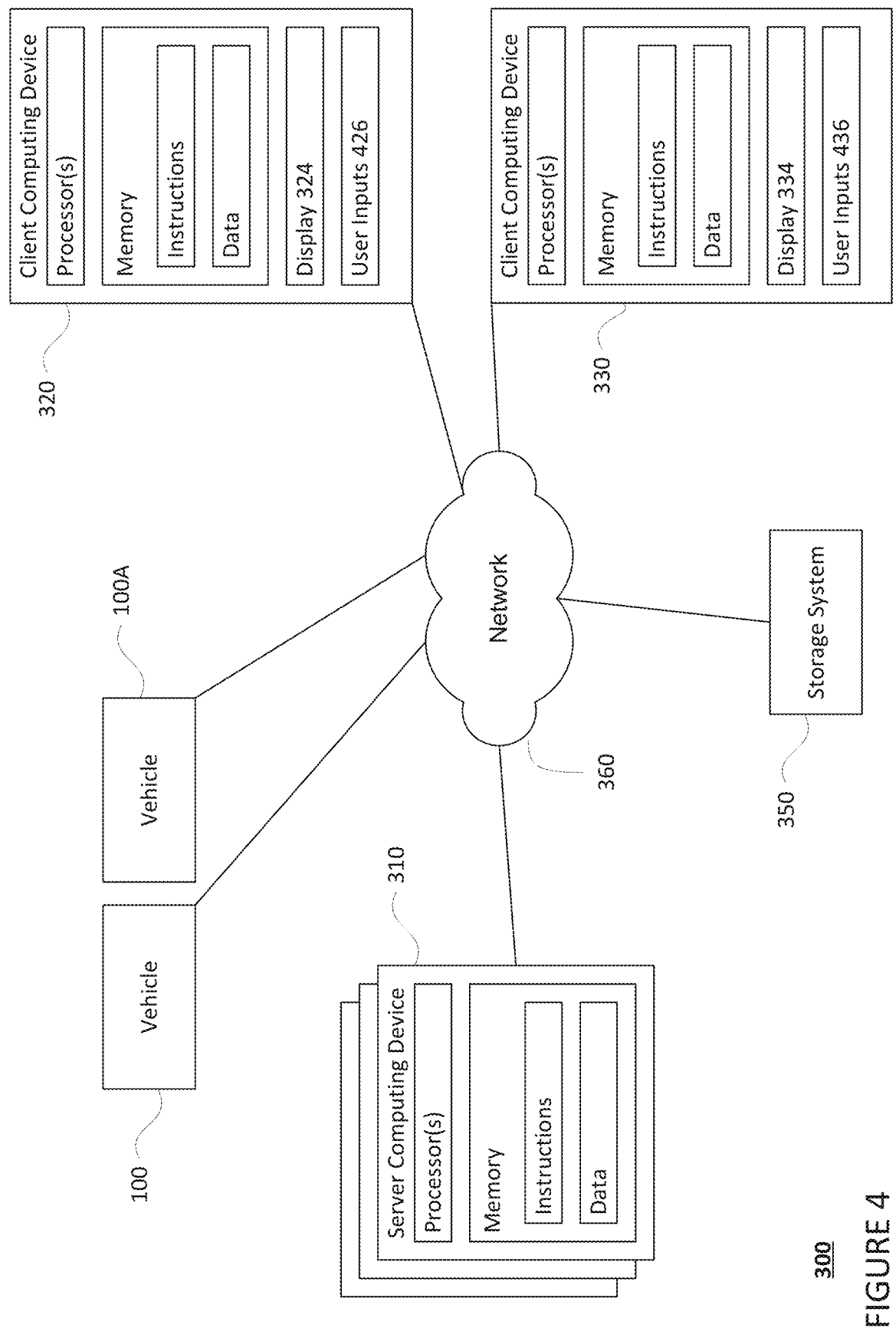
FIG. 4 is a functional diagram of the system of FIG. 3 in accordance with aspects of the disclosure.

The one or more computing devices 110 of vehicle 100 may also receive or transfer information to and from other computing devices. FIGS. 3 and 4 are pictorial and functional diagrams, respectively, of an example system 300 that includes a plurality of computing devices 310, 320, and 330 and a storage system 350 connected via a network 360. System 300 also includes vehicle 100, and vehicle 100A which may be configured similarly to vehicle 100. Although only a few vehicles and computing devices are depicted for simplicity, a typical system may include significantly more computing devices, vehicles, and storage systems.

As shown in FIG. 3, each of computing devices 310, 320, and 330 may include one or more processors, memory, data and instructions. Such processors, memories, data and instructions may be configured similarly to one or more processors 120, memory 130, data 134, and instructions 132 of computing devices 110.

The network 360, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, Wi-Fi and HTTP, and various combinations of the foregoing. Such communication may be facilitated by any device capable of transmitting data to and from other computing devices, such as modems and wireless interfaces.

In one example, one or more computing devices 310 may include a server having a plurality of computing devices, e.g., a load balanced server farm, that exchange information with different nodes of a network for the purpose of receiving, processing and transmitting the data to and from other computing devices. For instance, one or more computing devices 310 may include one or more server computing devices that are capable of communicating with one or more computing devices 110 of vehicle 100 or a similar computing device of vehicle 100A as well as client computing devices 320 and 330 via the network 360. For example, vehicles 100 and 100A may be a part of a fleet of vehicles that can be monitored and dispatched by server computing devices to various locations. In this regard, the vehicles of the fleet may periodically send the server computing devices location information provided by the vehicle's respective positioning systems and the one or more server computing devices may track the locations of the vehicles. Additionally, the vehicle's computing device 110 may provide video from the virtual camera system to the one or more server computing devices for storage and/or future viewing.

In addition, server computing devices 310 may use network 360 to transmit and present information to a user, such as users 322 and 332 on a display, such as displays 324 and 334 of computing devices 320 and 330. In this regard, computing devices 320 and 330 may be considered client computing devices.

As shown in FIG. 4, each client computing device 320 and 330 may be a personal computing device intended for use by a user 322, 332, and have all of the components normally used in connection with a personal computing device including a one or more processors (e.g., a central processing unit (CPU)), memory (e.g., RAM and internal hard drives) storing data and instructions, a display such as displays 324, 334, 344 (e.g., a monitor having a screen, a touch-screen, a projector, a television, or other device that is operable to display information), and user input devices 426, 436, 446 (e.g., a mouse, keyboard, touch-screen or microphone). The client computing devices may also include a camera for recording video streams, speakers, a network interface device, and all of the components used for connecting these elements to one another.

Although the client computing devices 320 and 330 may each comprise a full-sized personal computing device, they may alternatively comprise mobile computing devices capable of wirelessly exchanging data with a server over a network such as the Internet. By way of example only, client computing device 320 may be a mobile phone or a device such as a wireless-enabled PDA, a tablet PC, a wearable computing device or system, laptop, or a netbook that is capable of obtaining information via the Internet or other networks. In another example, client computing device 330 may be a wearable computing device, such as a "smart watch." As an example the user may input information using a keyboard, a keypad, a multi-function input button, a microphone, visual signals (for instance, hand or other gestures) with a camera or other sensors, a touch screen, etc.

Storage system 350 may store various types of information and data, such as videos generated by the virtual camera system 176. This information may be retrieved or otherwise accessed by a server computing device, such as one or more server computing devices 310, or client computing devices 320 and 330, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

As with memory 130, storage system 350 can be of any type of computerized storage capable of storing information accessible by the server computing devices 310, such as a hard-drive, memory card, ROM, RAM, DVD, CD-ROM, write-capable, and read-only memories. In addition, storage system 350 may include a distributed storage system where data is stored on a plurality of different storage devices which may be physically located at the same or different geographic locations. Storage system 350 may be connected to the computing devices via the network 360 as shown in FIG. 4 and/or may be directly connected to or incorporated into any of the computing devices 310, 320, 330, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

A virtual camera system within the vehicle may generate video. In this regard, the computing device may receive data from the vehicle's navigation system, positioning system, and perception system. The data received from these systems may include a vehicle's projected trajectory as well as data indicating objects, such as other vehicles, within the vicinity of the vehicle. For instance, projected trajectory information may be provided by the vehicle's navigation system 168 and positioning system 170 and the object data may be provided by the perception system 172. The computing device may pass this data to the virtual camera system.

Figure 6:
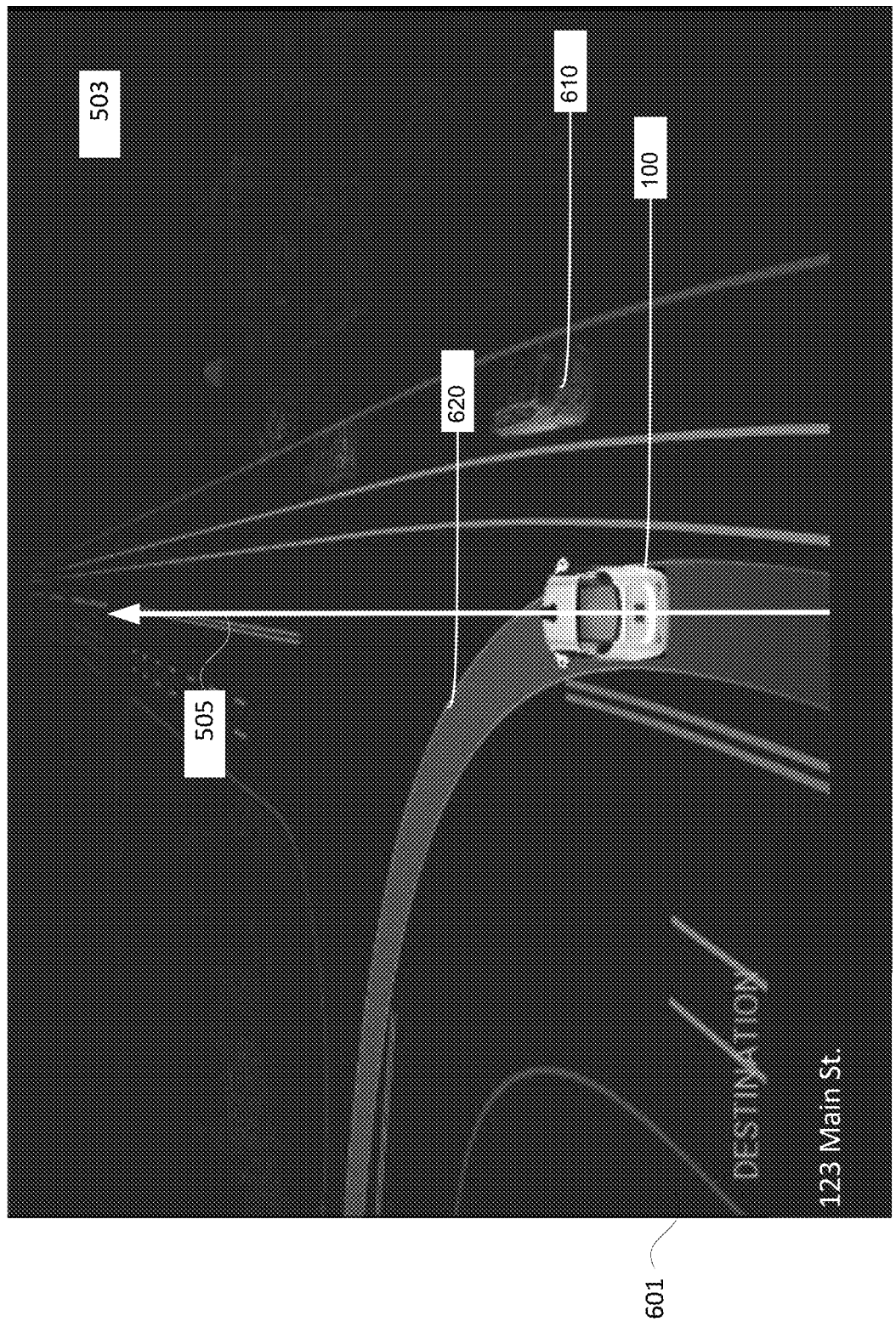
FIG. 6 is an illustration of a field of view of a virtual camera in accordance with aspects of the disclosure.

Based on the data received by the virtual camera system, a video may be generated for display on a display in the vehicle for viewing by the vehicle's passengers. In this regard, the virtual camera system may generate the video from a perspective of a virtual camera using the received data by overlaying the vehicle's projected trajectory and detected objects on a map corresponding to the route the vehicle is traveling. For instance, FIG. 6 shows one frame of a video generated by the virtual camera system from the perspective of a virtual camera positioned above and behind the vehicle. The video includes a map 601 presented within a set field of view 503 of the virtual camera. The video further includes a virtual representation of the vehicle 100 and the vehicle's surroundings 610 overlaid on the map 601, along with the vehicle's projected trajectory 620. The video may include animations, illustrations, live-action, and/or other such content typically found in videos.

Figure 5A:
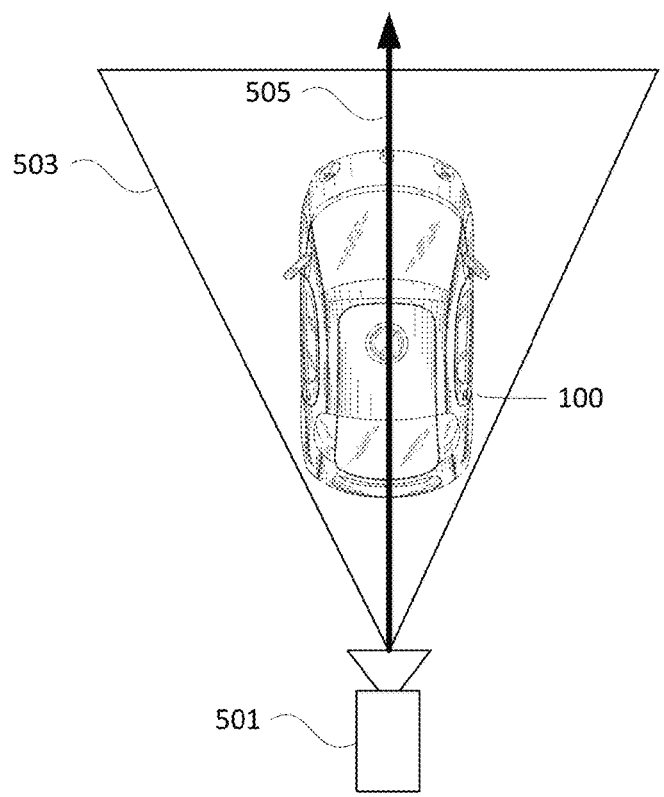
FIGS. 5A and 5B are illustrations of a virtual camera positioned at a default position in accordance with aspects of the disclosure.
Figure 5B:
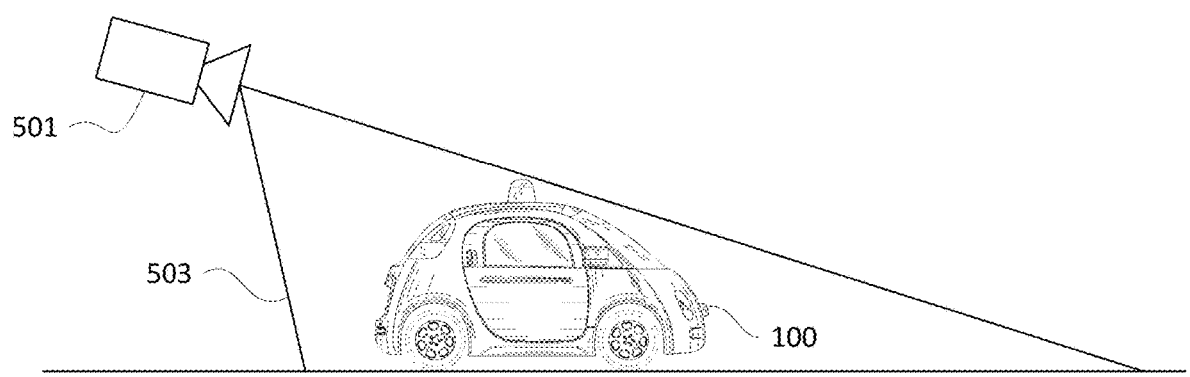

The perspective of a virtual camera may be fixed relative to the vehicle at a default position. For instance, this default position of the fixed position virtual camera 501 may be above and to the rear of the vehicle 100 and directed in a first heading 505, as shown in FIGS. 5A and 5B. The video may include imagery within a set field of view 503 corresponding to the first heading 505 and position of the fixed position virtual camera 501.

Upon the vehicle performing a turn, the fixed position virtual camera 501 may remain in the default position relative to the vehicle, such that the video will continue to provide the vehicle's surroundings 610 and the vehicle's projected trajectory 620 captured in the first heading 505 and located within the set field of view 503 as shown in the example video of FIG. 6.

Figure 7:
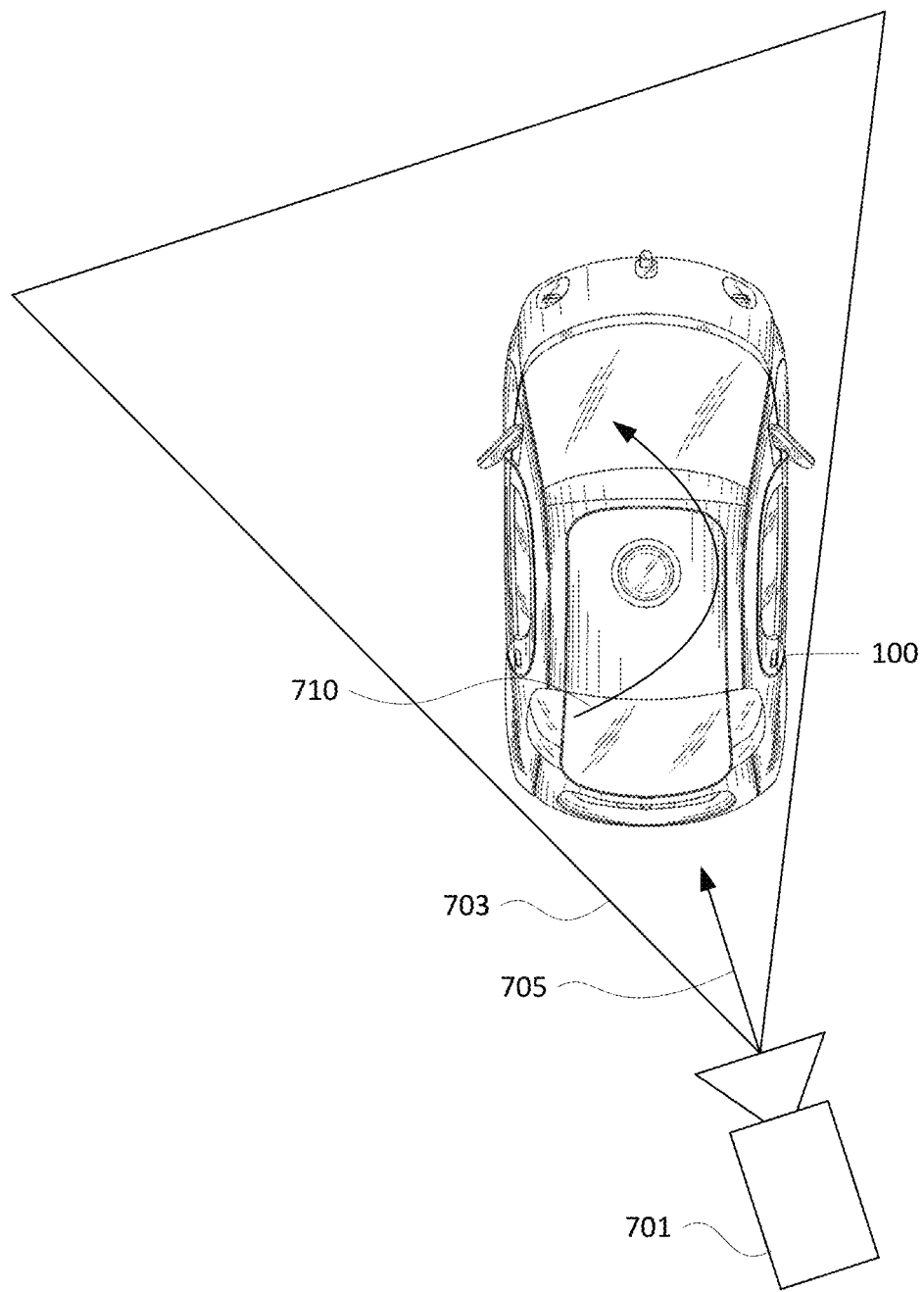
FIG. 7 is an illustration of a field of view of a virtual camera rotating in accordance with aspects of the disclosure.

As the vehicle performs a turn the position of the virtual camera may be rotated around the vehicle to present video within an adjusted field of view corresponding to the vehicle's anticipated heading. In this regard, the virtual camera may rotate a predetermined distance around the vehicle, from the default position, as the vehicle performs the turn. For example, upon the vehicle 100 making a turn in a first direction 710 from a first road to a second road, the virtual camera 701 may rotate counter clockwise from its fixed positioned to be directed at a new heading 705, as shown in FIG. 7. As such, the field of the view of the virtual camera may correspond to an updated field of view 703.

Figure 8:
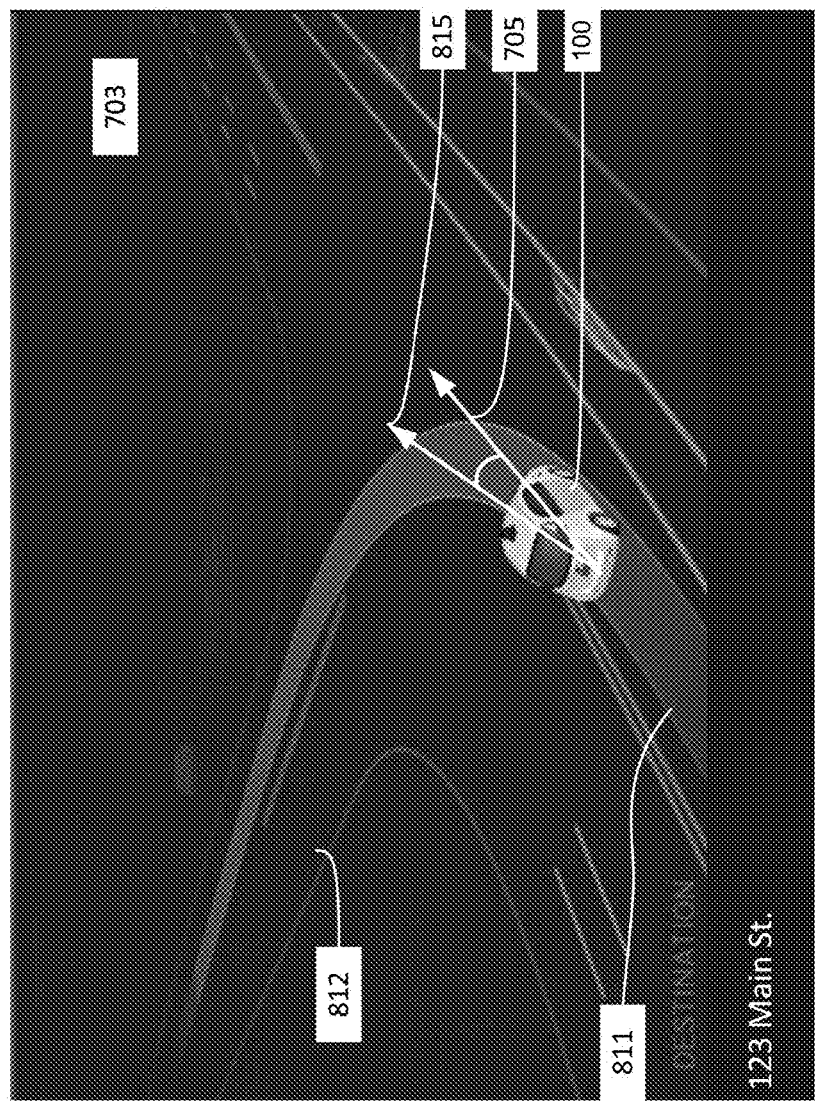
FIG. 8 is an illustration of a field of view of a virtual camera in based on a vehicle's projected trajectory in accordance with aspects of the disclosure.
Figure 9:
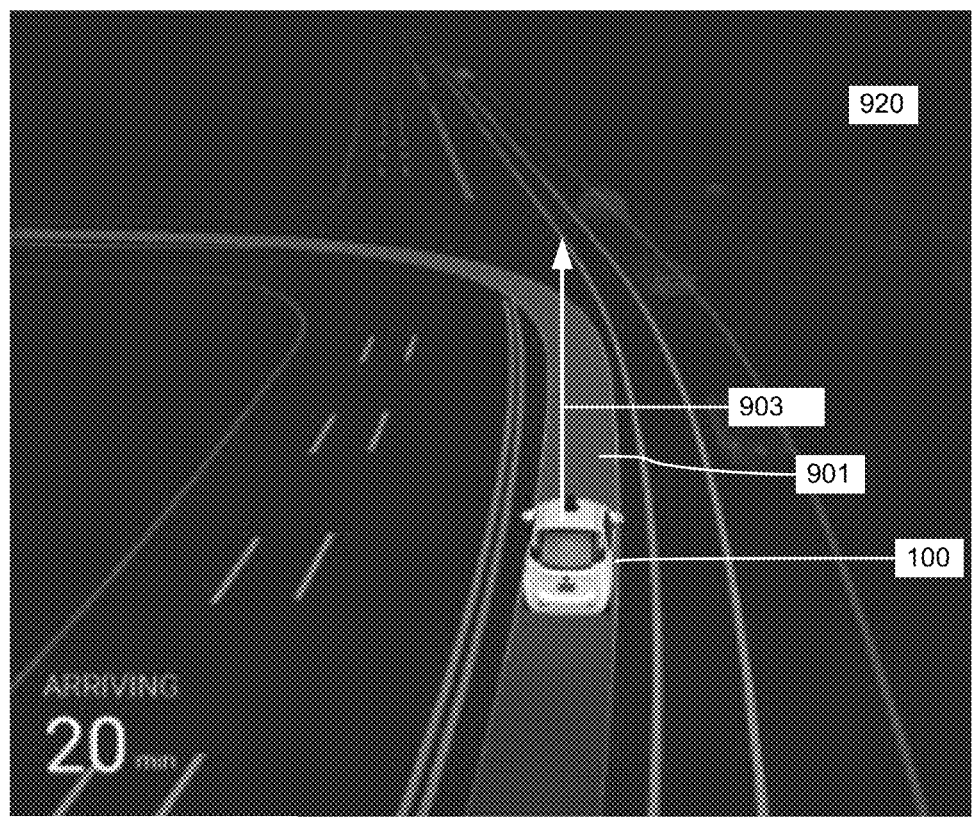
FIGS. 9-12 are illustrations of a field of view of a virtual camera changing as a vehicle progresses through a turn, in accordance with aspects of the disclosure.

The updated field of view 703 may be adjusted such that the video includes imagery of the second road 812 onto which the vehicle 100 is turning, as shown in FIG. 8. Although the above example shows the vehicle 100 turning from a first road 811 to a second road, as discussed below, the virtual camera rotation may occur when the vehicle 100 makes any turning motions, such as around a bend on a road or into a parking spot.

The distance the virtual camera 701 rotates around the vehicle may be based on the angle of the turn the vehicle is performing. The angle of the turn the vehicle is performing may be determined by measuring the angular difference between the original heading 705 which the vehicle was originally on before performing a turn with the current heading 815 which the vehicle is currently on, as further shown in FIG. 8. The original heading 705 and the current heading may be provided by the vehicle's navigation system 168 and positioning system 170.

The virtual camera system may input the angle of the turn the vehicle is performing into a rotation table. The rotation table may map the angle of the turn to a camera rotation angle. For instance, the angle of the turn input into the rotation table may be 90° and the rotation table may map the 90° angle to a 45° camera rotation. The virtual camera system may then rotate the virtual camera 701 by the camera rotation angle, thereby causing the field of view of the virtual camera 701 to also rotate by the camera rotation angle.

As the vehicle progresses through the turn, the virtual camera system may continually update the camera rotation angle. For example, as shown in FIGS. 9-12, to complete a turn, the vehicle progresses through a series of angles such as 0°-90°, or more or less.

The virtual camera system may continually adjust the camera rotation angle based on the angle of the turn the vehicle is currently performing relative to the heading the vehicle was traveling prior to entering the turn. In this regard, the virtual camera system may update the camera rotation angle in substantially real-time by continually calculating a camera rotation angle based on the angle of the turn. For instance, the vehicle may be travelling along a projected trajectory 901 at an initial heading 903 and the virtual camera 701 may be positioned in the default position with a first field of view 920.

Figure 10:
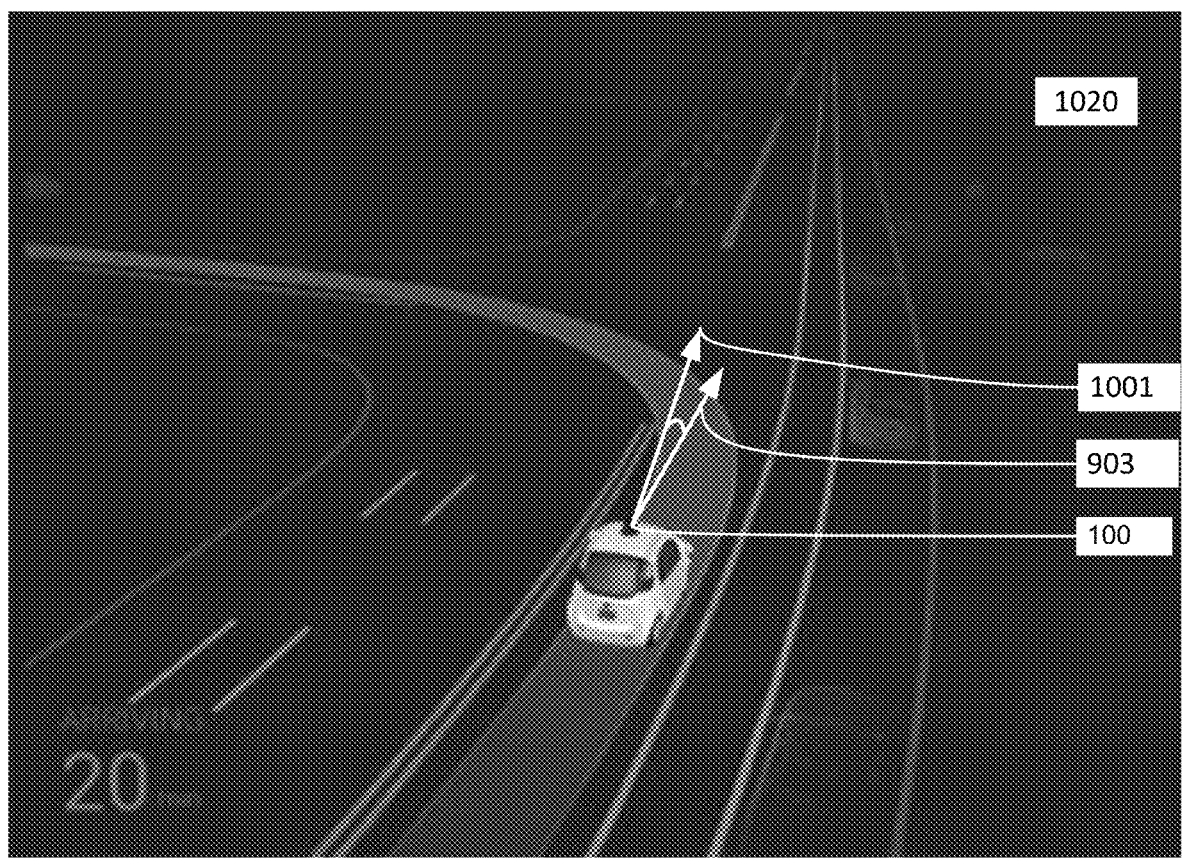

As the vehicle 100 begins to turn, the heading of the vehicle may be updated to a new heading 1003, as shown in FIG. 10. The difference between the initial heading and the new heading may be input into the rotation table and a camera rotation angle may be output. The virtual camera system may then rotate the virtual camera 701 by the output camera rotation angle, thereby causing the field of view of the virtual camera 701 to also rotate by the camera rotation angle to show a second field of view 1020, as further shown in FIG. 10.

Figure 11:
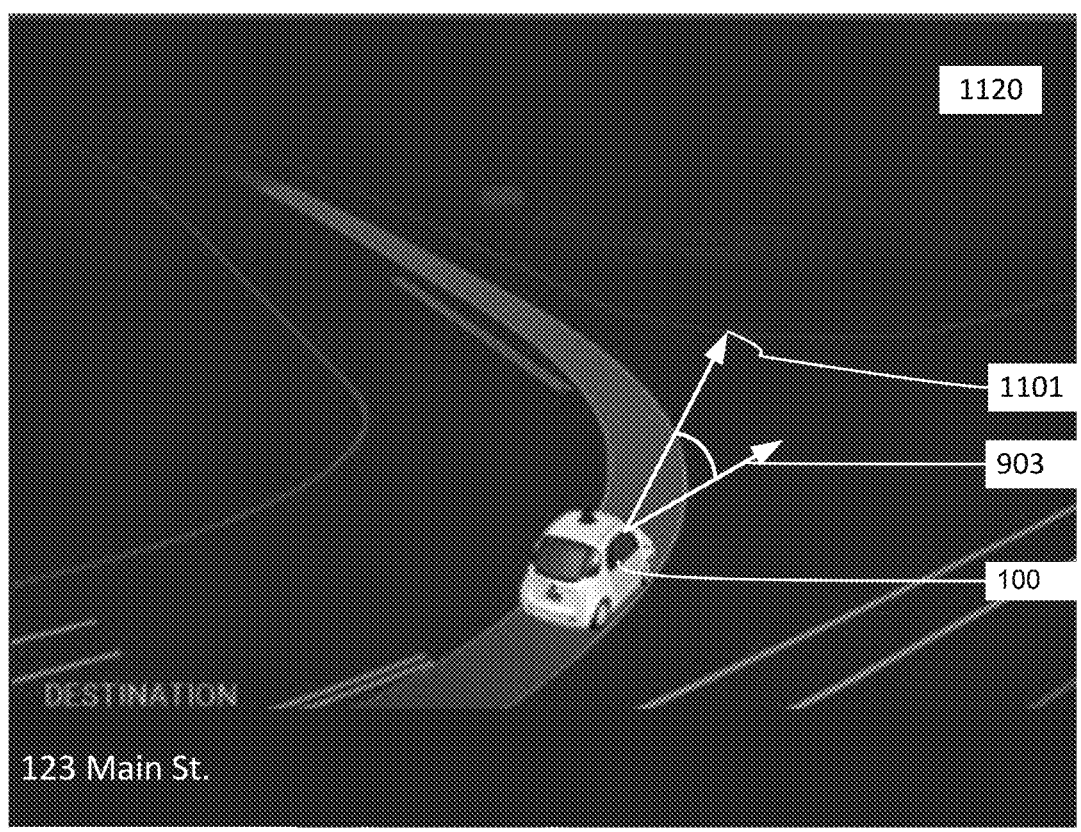
Figure 12:
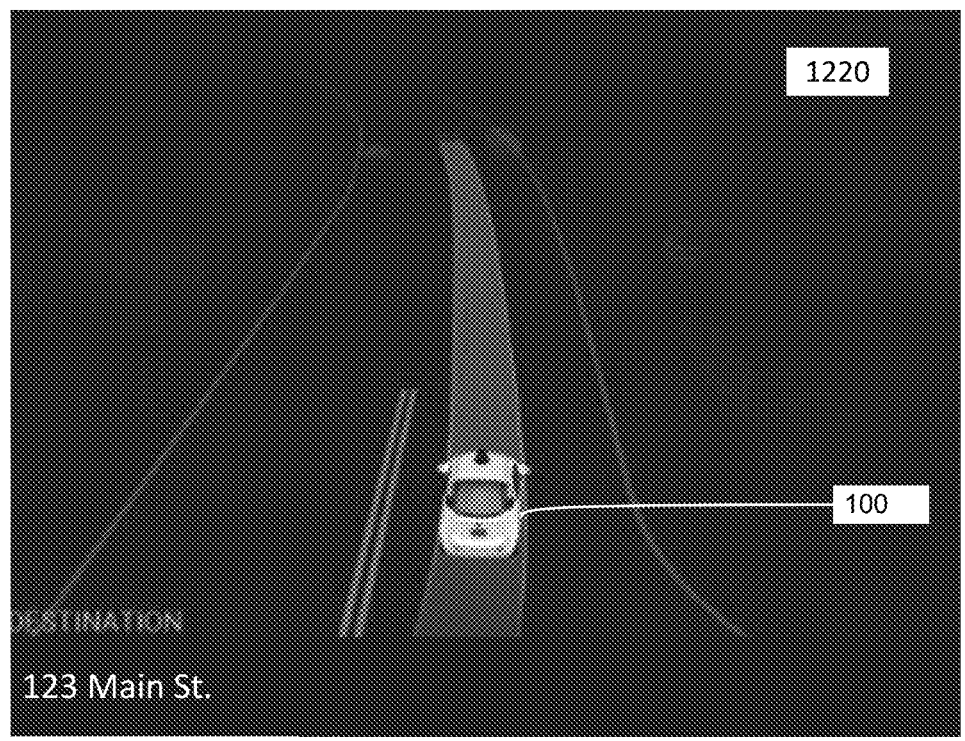

Similarly, as the vehicle 100 progresses along the turn, the difference between the initial heading 903 and the latest heading 1101, as shown in FIG. 11, may be input into the rotation table and a camera rotation angle may be output. The virtual camera system may then rotate the virtual camera 701 by the output camera rotation angle, thereby causing the field of view of the virtual camera 701 to also rotate by the camera rotation angle to show a third field of view 1120, as further shown in FIG. 11. The determination of the difference between the initial heading 903 and the latest heading 1101 may occur every hundredth of a second, or more or less. Upon completion of the turn by the vehicle 100, the virtual camera 701 may return back to the default position, thereby capturing field of view 1220 as shown in FIG. 12.

The virtual camera system may begin to rotate the virtual camera at a predetermined distance before the vehicle makes a turn. In this regard the virtual camera system may determine an anticipated angle of an upcoming turn of the vehicle based on the vehicle's projected trajectory. For example, the virtual camera system may monitor the vehicle's projected trajectory and the positioning of the vehicle to determine a distance the vehicle is from the upcoming turn and the anticipated angles of the turn the vehicle will be making. The virtual camera system may compare how far away a projected turn is to a predetermined distance. Upon the virtual camera system determining the projected turn is located at or less than the predetermined distance, the virtual camera system may begin to rotate the virtual camera through camera rotation angles corresponding to the anticipated angles of the turn.

The predetermined distance may be based on the speed of the vehicle and the distance the vehicle is from the turn. In this regard, when the vehicle is traveling at a higher rate of speed the predetermined distance may greater than when the vehicle is traveling at a slower rate of speed. This may allow for a smoother, more gradual rotation of the virtual camera.

In some embodiments, the rotation of the virtual camera may temporarily cease when the vehicle is stopped or projected to stop. For instance, the virtual camera may receive the vehicle's projected trajectory and determine the vehicle is going to turn left but will first pass through a stop light. As such, the virtual camera may not rotate until the car travels through the stop light.

Figure 13:
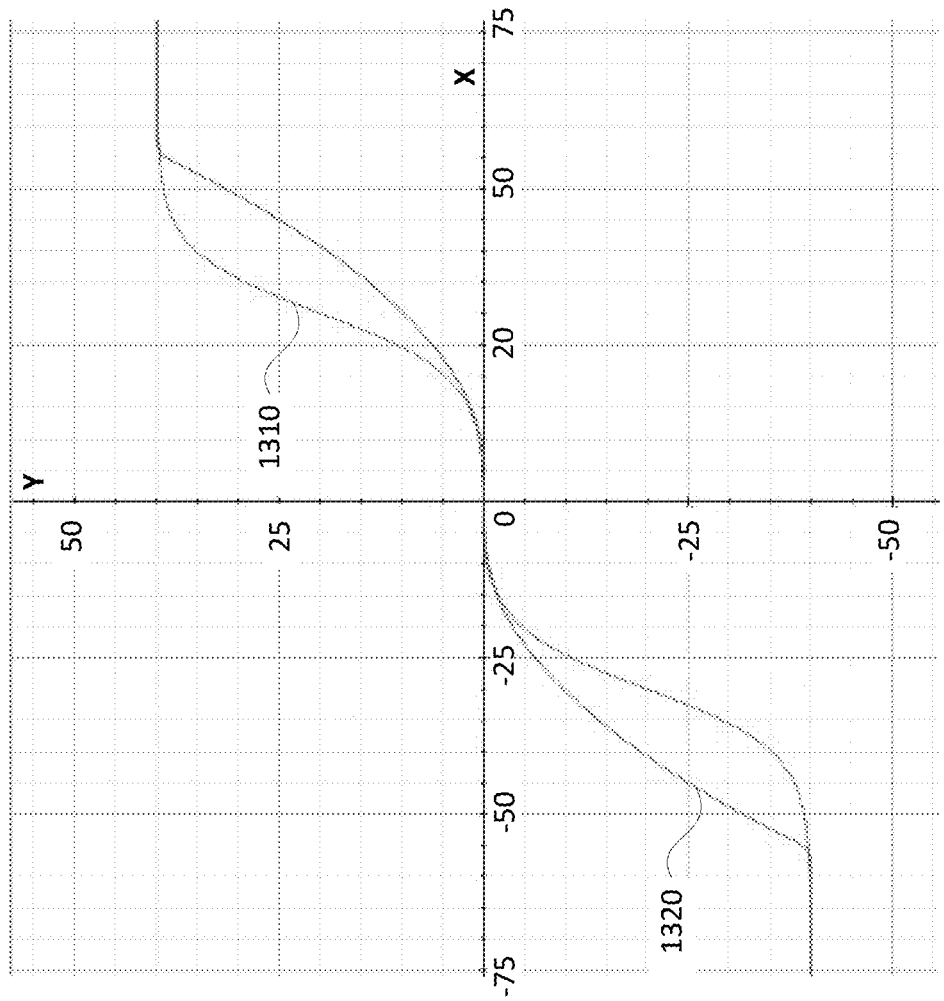
FIG. 13 is a chart showing the inputs and outputs of a squashing function in accordance with aspects of the disclosure.

A squashing function may be used to minimize minor camera rotations, such as those caused by minor oversteering corrections, etc., as well as to smooth larger camera rotations. In this regard, the squashing function may prevent the generated video from including imagery which appears to constantly switch position or move too quickly. For instance, two example squashing results, 1310 and 1302 are further shown in FIG. 13. To get squashing results, the angle of the turn the vehicle is performing, as shown by the X-axis of FIG. 13, may be input into a squashing function. The squashing function may calculate and output a corresponding camera rotation angle, as shown in the Y-axis. The output camera angle rotation values, as shown on the Y-axis, which may be more or less gradual than the angles of the turn, as shown on the X-axis.

Figure 14:
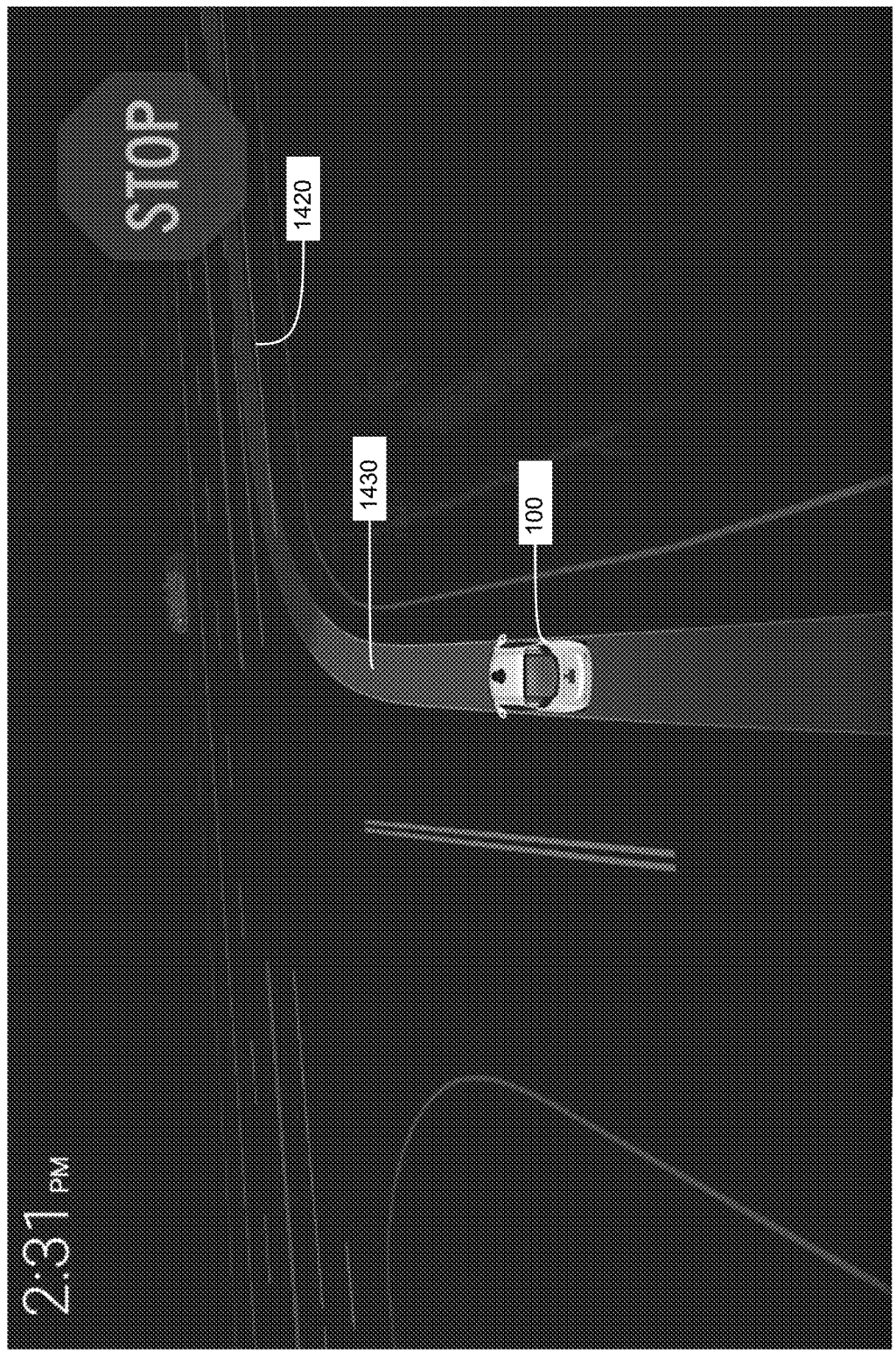
FIGS. 14 and 15 are illustrations of a field of view of a virtual camera rotating in an opposite direction than the direction which a vehicle is projected to turn in accordance with aspects of the disclosure.
Figure 15:

As one example, the virtual camera system may rotate the virtual camera to generate imagery corresponding to oncoming traffic at unprotected turns. In this regard, the virtual camera may rotate in the opposite direction of the vehicle's projected trajectory 1430 to generate imagery corresponding to other vehicles 1501 travelling on the road where the vehicle is attempting to turn 1420, as shown in FIGS. 14 and 15. The camera rotation angle may be predetermined for unprotected turns, such as 45° or more or less. As such, the generated video may provide passengers of the vehicle with imagery similar to that which they would experience were they driving the vehicle. Unprotected turns may include turns where the vehicle is turning onto a road where traffic is moving, such as a right on red or right at a stop sign at an intersection where the road the car is turning onto does not require other vehicles to stop at the intersection.

Figure 16:
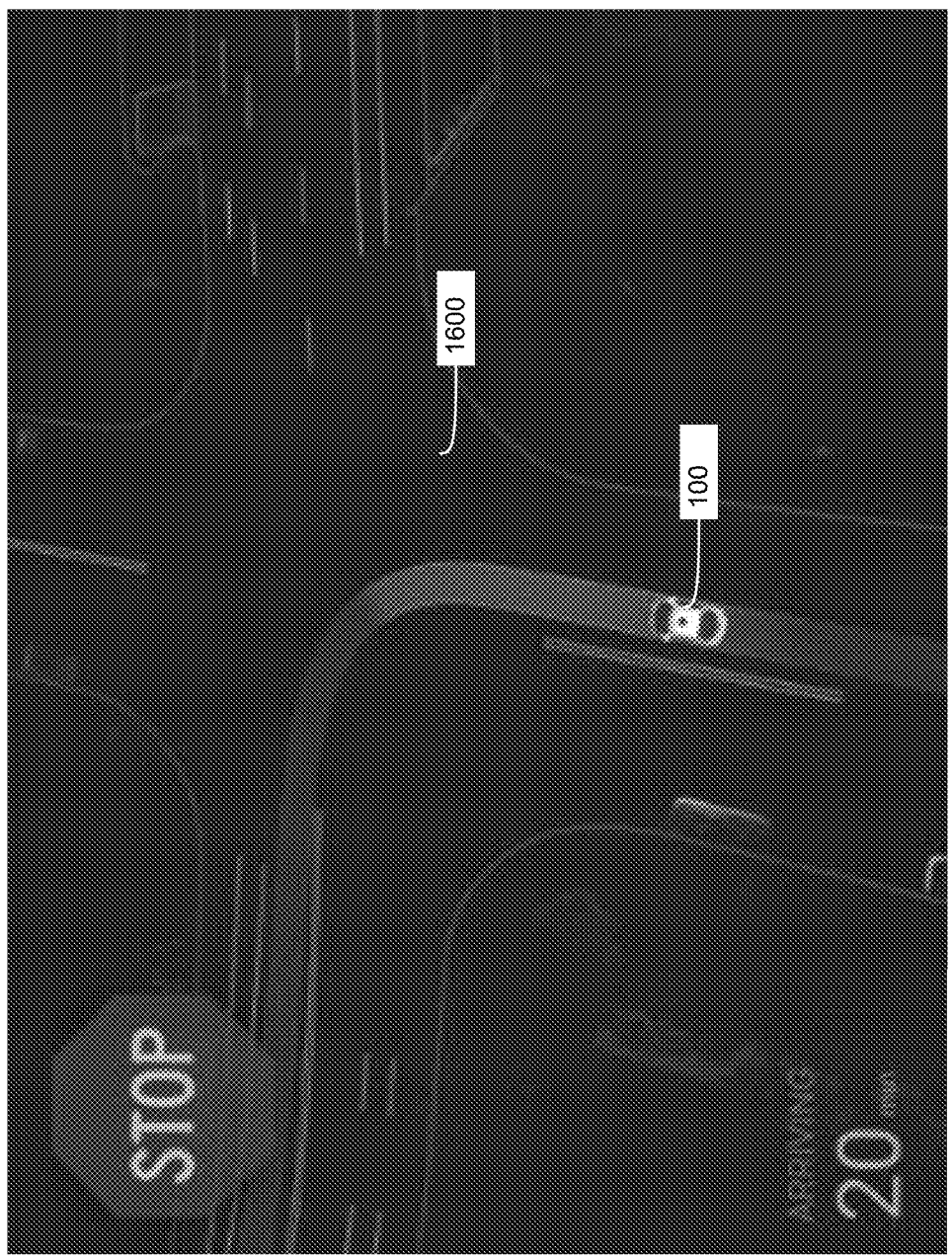
FIG. 16 is an illustration of a field of view of a virtual camera positioned above a vehicle in accordance with aspects of the disclosure.

The height and pitch of the virtual camera may also be adjusted to capture more or less of the vehicle's surroundings. For example, when the vehicle is stopped at an intersection 1600 the virtual camera 710 may be positioned above the vehicle 100 and the pitch of the virtual camera may be adjusted such that it looks down to the vehicle, as shown in FIG. 16. The virtual camera 710 may look straight down on the vehicle 100. The virtual camera 710 may then generate a video which includes imagery from all around the vehicle as further shown in FIG. 16.

Figure 17:
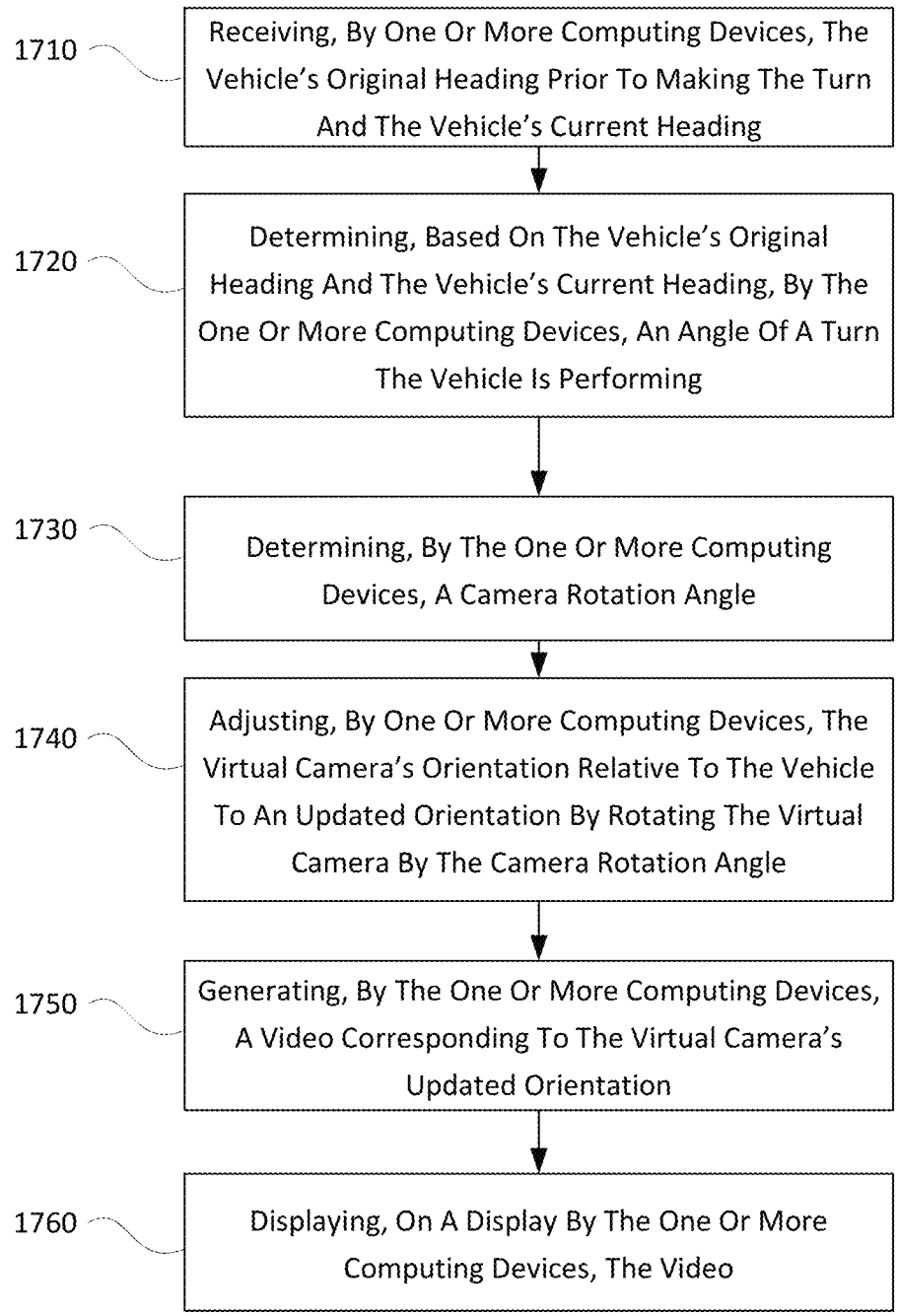
FIG. 17 is a flow diagram in accordance with aspects of the disclosure.

FIG. 17 is an example flow diagram 1700 which may be performed by one or more computing devices of a vehicle, such as computing device 110 of vehicle 100 in order to adjust a virtual camera's orientation when a vehicle is making a turn. In this example, the computing one or more computing devices may receive the vehicle's original heading prior to making the turn and the vehicle's current heading as shown in block 1710. Based on the vehicle's original heading and the vehicle's current heading, the one or more computing devices may determine an angle of a turn the vehicle is performing as shown in block 1720. The one or more computing devices may determine a camera rotation angle, as shown in block 1730, and adjust the virtual camera's orientation relative to the vehicle to an updated orientation by rotating the virtual camera by the camera rotation angle, as shown in block 1740. The one or more computing devices may generate a video corresponding to the virtual camera's updated orientation as shown in block 1750 and display the video on a display as shown in block 1760.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer implemented method, comprising:
    determining, by one or more computing devices of a vehicle operating in an autonomous mode, a projected trajectory of the vehicle;
    determining, by the one or more computing devices based on the vehicle's projected trajectory and positioning of the vehicle, an anticipated angle of an upcoming turn the vehicle is planning to perform;
    comparing, by the one or more computing devices, how far away the upcoming turn is to a predetermined distance that is based on a current speed of the vehicle and a current distance the vehicle is from the upcoming turn;
    adjusting, by the one or more computing devices, an orientation of a virtual camera relative to the vehicle from an initial orientation to an updated orientation by rotating the virtual camera by a camera rotation angle corresponding to the determined anticipated angle of the upcoming turn; and
    generating for display, by the one or more computing devices, a video corresponding to the virtual camera's updated orientation, the video being configured for presentation to passengers within the vehicle as the vehicle is operating in the autonomous mode;
    wherein upon the one or more computing devices determining that the upcoming turn is located at or less than the predetermined distance, beginning to rotate the virtual camera through a series camera rotation angles corresponding to a set of anticipated angles of the upcoming turn.

2. The computer implemented method of claim 1, wherein when the vehicle is traveling at a higher rate of speed the predetermined distance is greater than when the vehicle is traveling at a slower rate of speed.

3. The computer implemented method of claim 1, further comprising mapping one or more angles of the upcoming turn to the camera rotation angle.

4. The computer implemented method of claim 3, wherein the mapping is not a 1:1 correspondence.

5. The computer implemented method of claim 4, wherein when a given angle of the upcoming turn is 90° the given angle is mapped to a 45° camera rotation angle.

6. The computer implemented method of claim 1, wherein as the vehicle progresses through the upcoming turn, the camera rotation angle is continually updated.

7. A computer implemented method, comprising:
    determining, by one or more computing devices of a vehicle operating in an autonomous mode, a projected trajectory of the vehicle;
    determining, by the one or more computing devices based on the vehicle's projected trajectory and positioning of the vehicle, an anticipated angle of an upcoming turn the vehicle is planning to perform;
    adjusting, by the one or more computing devices, an orientation of a virtual camera relative to the vehicle from an initial orientation to an updated orientation by rotating the virtual camera by a camera rotation angle corresponding to the determined anticipated angle of the upcoming turn, wherein the rotating of the virtual camera temporarily ceases when the vehicle is stopped or projected to stop; and
    generating for display, by the one or more computing devices, a video corresponding to the virtual camera's updated orientation, the video being configured for presentation to passengers within the vehicle as the vehicle is operating in the autonomous mode.

8. The computer implemented method of claim 1, further comprising returning the virtual camera to a default position upon completion of the upcoming turn.

9. The computer implemented method of claim 1, wherein a height and a pitch of the virtual camera is adjusted to capture more or less of the vehicle's surroundings during a driving operation in the autonomous mode.

10. A vehicle configured to operate in an autonomous driving mode, the vehicle comprising:
    a steering system;
    an acceleration system;
    a deceleration system;
    a perception system including one or more sensors configured to detect objects in an environment external to the vehicle;
    an autonomous driving system including one or more processors, the autonomous driving system operatively coupled to the steering system, the acceleration system, the deceleration system and the perception system to control driving of the vehicle in the autonomous driving mode; and
    a virtual camera system having one or more processors, the virtual camera system being configured to determine a set of anticipated angles of an unprotected turn, and rotate a virtual camera to generate imagery corresponding to oncoming traffic at the unprotected turn according to the determined set of anticipated angles, wherein a camera rotation angle of the virtual camera is predetermined for the unprotected turn.

11. The vehicle of claim 10, wherein the camera rotation angle is 45° or less.

12. The vehicle of claim 10, wherein the unprotected turn is either where the vehicle is turning onto a road where traffic is moving, or where the road the vehicle is turning onto does not require other vehicles to stop at an intersection.

13. The vehicle of claim 10, wherein:
the camera rotation angle is a series of camera rotation angles corresponding to the set of anticipated angles of the unprotected turn; and
the virtual camera system is further configured to:
compare how far away the unprotected turn is to a predetermined distance; and
upon a determination that the unprotected turn is located at or less than the predetermined distance, begin to rotate the virtual camera through the series of camera rotation angles.

14. The vehicle of claim 10, wherein the virtual camera system is further configured to map one or more angles of the unprotected turn to the camera rotation angle.

15. The vehicle of claim 14, wherein the mapping is not a 1:1 correspondence.

16. The vehicle of claim 10, wherein the virtual camera system is further configured to temporarily cease rotation of the virtual camera when the vehicle is stopped or projected to stop.

17. The vehicle of claim 10, wherein the virtual camera system is further configured to return the virtual camera to a default position upon completion of the unprotected turn.

* * * * *